United States Patent
Zömbik et al.

(10) Patent No.: US 9,787,721 B2
(45) Date of Patent: Oct. 10, 2017

(54) SECURITY INFORMATION FOR UPDATING AN AUTHORIZATION DATABASE IN MANAGED NETWORKS

(71) Applicant: Telefonaktiebolaget L M Ericsson (publ), Stockholm (SE)

(72) Inventors: Lászlo Zömbik, Zalaegerszeg (HU); Géza János Huszár, Inarcs (HU); Aleksandar Milenovic, Roscommon (IE)

(73) Assignee: TELEFONAKTIEBOLAGET L M EIRCSSON (PUBL), Stockholm (SE)

( * ) Notice: Subject to any disclaimer, the term of this patent is extended or adjusted under 35 U.S.C. 154(b) by 0 days.

(21) Appl. No.: 14/653,553

(22) PCT Filed: Dec. 21, 2012

(86) PCT No.: PCT/EP2012/076646
§ 371 (c)(1),
(2) Date: Jun. 18, 2015

(87) PCT Pub. No.: WO2014/094875
PCT Pub. Date: Jun. 26, 2014

(65) Prior Publication Data
US 2015/0334132 A1   Nov. 19, 2015

(51) Int. Cl.
*H04L 17/00* (2006.01)
*H04L 29/06* (2006.01)
(Continued)

(52) U.S. Cl.
CPC ........ *H04L 63/20* (2013.01); *G06F 17/30345* (2013.01); *H04L 41/0803* (2013.01);
(Continued)

(58) Field of Classification Search
CPC . H04L 63/20; H04L 41/0803; H04L 41/0233; H04L 63/10; H04L 63/102; G06F 17/303215
See application file for complete search history.

(56) References Cited

U.S. PATENT DOCUMENTS 6,105,027 A  *  8/2000  Schneider .......... H04L 63/0218
6,178,505 B1 *  1/2001  Schneider .......... H04L 63/0218
                                                                 713/168
(Continued)

FOREIGN PATENT DOCUMENTS

EP    2 407 907 A1    1/2012

OTHER PUBLICATIONS

International Search Report and Written Opinion of the International Searching Authority, International Application No. PCT/EP2012/076646, dated Sep. 23, 2013.
(Continued)

*Primary Examiner* — Sharon Lynch
(74) *Attorney, Agent, or Firm* — Sage Patent Group

(57) ABSTRACT

A method for amending, by a rule engine, a network element in a telecommunications network containing network elements each described by at least one parameter. An authorization database contains information for who and what extent configuring operators have access to the network elements, and a rule repository containing parameter dependent rules describing which activity is carried out for the network elements, and parameter dependent security information describing whether and how configuring operators are supervised by a security administrator when amending and how the authorization database is amended for a network element. A request for amending the network element in the network is identified and its parameter is determined. A rule is determined in the rule repository for which the parameter corresponds to the parameter of the amended (Continued)

network element and the security information for the determined rule is determined. The authorization database is updated using the security information.

9 Claims, 6 Drawing Sheets

(51) Int. Cl.
  G06F 17/30 (2006.01)
  H04L 12/24 (2006.01)
(52) U.S. Cl.
  CPC .............. H04L 41/28 (2013.01); H04L 63/10 (2013.01); H04L 63/102 (2013.01); *H04L 41/0233* (2013.01)

(56) References Cited

U.S. PATENT DOCUMENTS

| | | | | |
|---|---|---|---|---|
| 7,219,142 | B1* | 5/2007 | Parekh | H04L 41/0893 709/223 |
| 2002/0016840 | A1* | 2/2002 | Herzog | H04L 41/044 709/225 |
| 2002/0026592 | A1* | 2/2002 | Gavrila | G06F 21/6218 726/6 |
| 2003/0037263 | A1* | 2/2003 | Kamat | G06F 21/604 726/14 |
| 2003/0046576 | A1 | 3/2003 | High, Jr. et al. | |
| 2005/0193196 | A1* | 9/2005 | Huang | G06F 21/6218 713/166 |
| 2006/0005229 | A1* | 1/2006 | Palekar | G06F 21/6218 726/1 |
| 2007/0143390 | A1* | 6/2007 | Giambalvo | G06F 8/61 709/200 |
| 2007/0240231 | A1* | 10/2007 | Haswarey | G06F 21/6218 726/28 |
| 2008/0022370 | A1* | 1/2008 | Beedubail | G06F 21/6218 726/4 |
| 2009/0320088 | A1* | 12/2009 | Gill | G06F 21/604 726/1 |
| 2010/0146600 | A1* | 6/2010 | Eldar | G06F 21/6218 726/5 |
| 2011/0131572 | A1* | 6/2011 | Elyashev | G06F 9/45533 718/1 |
| 2015/0220710 | A1* | 8/2015 | Cherubini | G06F 21/57 726/19 |
| 2016/0028772 | A1* | 1/2016 | Eldar | G06F 21/6218 726/1 |

OTHER PUBLICATIONS

László Zömbik:"TBAC AL0 for O12.2", Ericsson Confidential; ETH-11:000835 Uen, Rev A; Nov. 23, 2011; 56 pages.
Ericsson: "TBAC, Target Based Access Control", Ericsson LMI 2012, Jun. 14, 2012; Getting Started Guide; 20 pages.
Ericsson: "TSS, Telecom Security Services" Ericsson LMI 2005, 2007-2011. Aug. 3, 2011; System Administrator Guide; 151 pages.
Ericsson: "Introduction to OSS-RC" LM Ericsson(LMI)2012. Feb. 9, 2012; 95 pages.

* cited by examiner

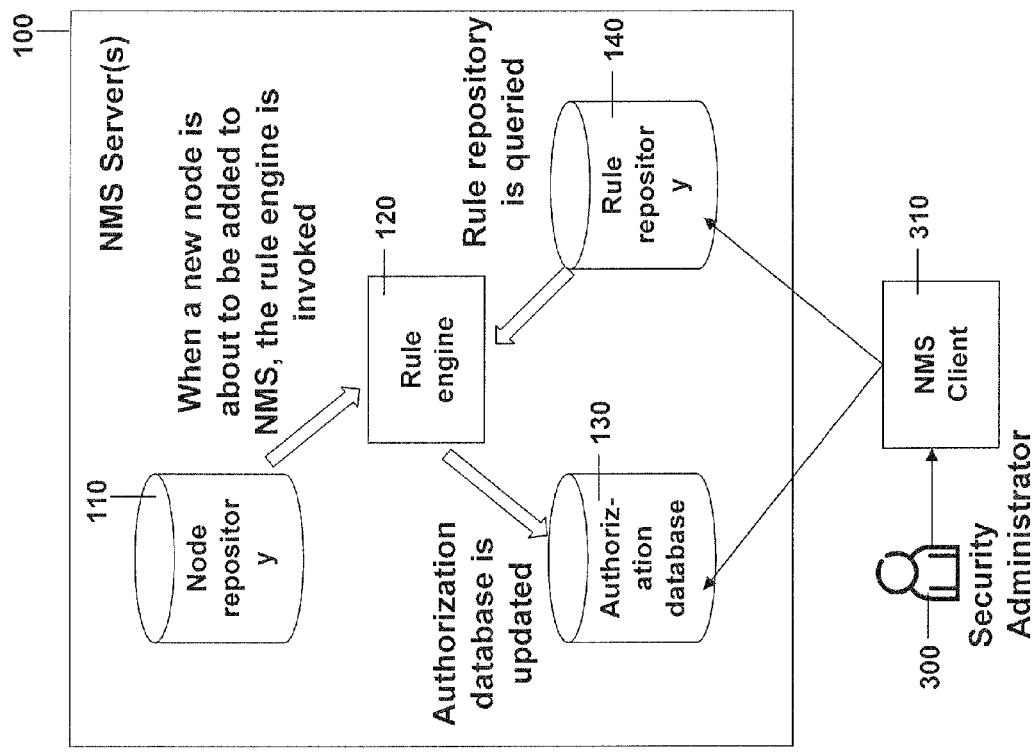
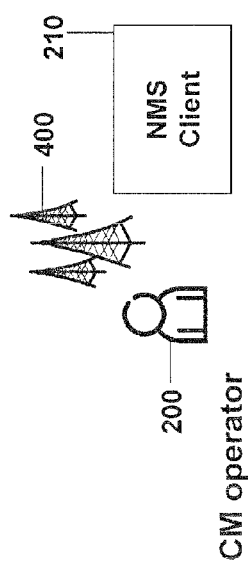
FIG. 1

| ID | Pre-Condition | *CM interaction | CM action | Security Admin interaction | Security Administrator action |
|---|---|---|---|---|---|
| 1 | <type of node> = LTE && <operation> = Node_integration | Select from List | Add <node> to elements of List ( *Dallas*=> {"DALLAS_TG", "TEXAS_TG", "WEST_COAST_TG", "SOUTH_US_STATE_TG", "USA_TG"}; *Houston*=> {"HOUSTON_TG", "TEXAS_TG", "WEST_COAST_TG", "SOUTH_US_STATE_TG", "USA_TG"}; *Los Angeles*=> {"LA_TG", "CALIFORNIA_TG", "WEST_COAST_TG", "USA_TG"}; *New York*=> {"NY_TG,", "STATE_NEW_YORK_TG", "EAST_COAST_TG", "USA_TG"}; *Washington DC*=> {"WASHINGTON_DC_TG", "EAST_COAST_TG", "USA_TG"}(Default);) | confirm | None |
| 2 | <type of node> = LTE && <operation> = Node_remove | None | Delete <node> from elements of list ("" => {All Groups*}) | None | None |
| 3 | <type of node> = LTE && <operation> = Node_remove | None | Add <node> to {"ALL_GROUP", "LTE_GROUP"} | None | None |
| 4 | <type of node> = WCDMA && <operation> = Node_integration | Select from List | Add <node> to elements of List ( *Dallas*=> {"DALLAS_TG", "TEXAS_TG", "WEST_COAST_TG", "SOUTH_US_STATE_TG", "USA_TG"}; *Houston*=> {"HOUSTON_TG", "TEXAS_TG", "WEST_COAST_TG", "SOUTH_US_STATE_TG", "USA_TG"}) | None | None |
| 5 | <type of node> = LTE && <operation> = Node_integration | Select from List | Select "Select those people who have to have at least read rights to <node>" List ( *operator3* => operator4, operator4 operator4, leader1 => leader1, leader2 => leader2, boss1 => boss1, boss2 => boss2) | Confirm & create ACL entry | Create ACL entry (<node>, ReadAccess, <user>) |

FIG. 5

SECURITY INFORMATION FOR UPDATING AN AUTHORIZATION DATABASE IN MANAGED NETWORKS

CROSS REFERENCE TO RELATED APPLICATION

This application is a 35 U.S.C. §371 national stage application of PCT International Application No. PCT/EP2012/076646, filed on 21 Dec. 2012, the disclosure and content of which is incorporated by reference herein in its entirety. The above-referenced PCT International Application was published in the English language as International Publication No. WO 2014/094875 A1 on 26 Jun. 2014.

TECHNICAL FIELD

The invention relates to a method for amending a network element in a telecommunications network by a rule engine and to a network management system configured to amend a network element.

RELATED ART

Management systems, such as NMS (Network Management System) or DMS (Domain Management System) allow various networks to be managed. Networks managed by a NMS or DMS system can be the different RANs (Radio Access Networks), such as GSM RAN, UMTS RAN or LTE RAN. A managed network can also be a transport or core network for the RAN networks, and it can be an IT network or any arbitrary IP network. The size of the managed network elements can be in the order of tens of thousands, but may also go up to more than one million.

The management function of NMS/DMS systems covers a FCAPS model, FCAPS being an abbreviation for providing a Fault Management, Configuration Management, Accounting Management, Performance Management and Security Management. In the case of a telecommunications network the network may be built by different nodes, such as a Base Station (BTS), a Base Station Controller (BSC), a Home Location Register (HLR), a Mobile Switching Center (MSC), a Radio Base Station (RBS), a Radio Network Controller (RNC), an evolved NodeB (eNB), a Serving GPRS Support Node (SGSN), a Gateway GPRS Support Node (GGSN), a Mobility Management Entity (MME) etc.

When a new node is installed in the network, it is added to the management system. In the management system several and typically manual configuration steps are performed in order for the node to become ready to operate. This, however, leads to an excessive workload when the network contains a larger number of nodes. In a network the network operators who are managing the management systems can be classified into two different groups:

A configuring operator (also named configuration manager) or CM operator who is responsible for the configuration and management related tasks in the FCAPS model. Furthermore, the configuring operator may be responsible for the fault management and any related activities which keep the node operational.

A security administrator: The latter is responsible for the security management related activities including inter alia the access control configuration of the network elements. During the configuration of security, the network administrator has to follow the corporate security policies. When the corporate security policies allow a certain freedom, the security manager may need input from other sources, such as the configuring operator.

In current management systems the following steps are normally performed in order to make a new node operational in a managed network. The order of the steps discussed below may vary. Additionally, as a prerequisite, engineers in the field are mounting the hardware, make some basic hardware and software configurations, install the basic operations systems or software, etc.

In one step the configuring manager defines the node in the management system. This can include the specification of the name, IP address or any other identification information of the node.

The management system, normally without user interaction, establishes contact to the node based on the provided identification information, and information can be exchanged, e.g. the type and the model of the node is clarified).

In a further step which is more typically non-user interactive the new node is added to the databases of the management system with default information.

The security administrator sets the authorization information which will be applied for the node in the management system. By way of example, the security administrator specifies before the node to be added which configuring operator will be authorized to view the node or to manage it.

The security administrator optionally sets other security related configuration in the management system and in the node as well (e.g. setting IP security tunnels, configuring the address of security log server, etc.).

The configuring operator sets the configuration specific parameters for the node in the management system. Then the configuring operator or the management system applies the configuration to the node, e.g. sets the neighboring cells or places the node into the relevant cluster, etc. The set of actions and the list of nodes available to the configuring operator is limited by the corresponding access rights.

Last but not least the configuring operator activates the node in the network to operate.

The above disclosed involvement of the configuring operator and the security administrator is normally achieved by using a management graphical user interface. However, when several nodes or even a new network need to be deployed, the graphical user interface is not the most efficient way. The disadvantage of such a graphical user interface is that by way of example time-consuming workflows are needed and human resources are required. For this reason an interface to handle several transactions efficiently is provided. This interface can be for example a CLI (Command Line Interface), an API or an importing capability from a data file.

Each DMS/NMS system has its own authorization database. Sophisticated authorization systems furthermore utilize the target itself or subject of the authorization in addition to the activity requested to be performed. When the subject is part of the authorization decision, it is called Target Based Access Control (TBAC). TBAC opens the possibility to define authorization based on a location, e.g. a configuration operator has access to nodes of the network in Manhattan or the operator has access to nodes based on some arbitrary grouping of nodes. These targets are given to the configuring operator by the security manager.

EP 1 109 413 A discloses a general model of a management system.

Referring back to the above-described steps, the management system repositories are filled with default information in the third step. This information does not contain special or node specific properties of the node, as these properties will be specified in the other steps following later on.

To set the access rights of a network element properly by the configuring operator, several steps have to be performed. The security administrator should know the location information of the network element. Furthermore, the security administrator should know whether the node belongs to any of the groups and to which one of the groups. Based on this information and based on the company security policies as well as the current organizational structure of the CM operators the security administrators has to make decisions and assign proper rights on the proper nodes for the proper configuring operators. This manual operation includes several steps and is time-consuming.

A configuring manager only has the authority of setting configuration parameters and is normally not allowed to set security parameters. The security related activities require involvement of another person, i.e. the security administrator, which makes the operation more complex. If the two jobs of the security operator and the configuring operator are handled by a single person, then the separation of the duties cannot be guaranteed. As a result, the overall security is weaker, as the user and the configurator of the security is the same person. In a Target Based Access Control there is a need to ensure that only certain configuring operators of the management system have access to a limited set of network elements.

Accordingly, a need exists to provide a method and a system with which an amendment of a network element in a telecommunications network becomes less time-consuming and easier to handle.

SUMMARY

This need is met by the features of the independent claims. Additional options and features are described in the dependent claims.

According to a first aspect of the invention, a method for amending, by a rule engine, a network element in a telecommunications network is provided, the network containing a plurality of network elements. Each network element is described by at least one parameter and the network comprises an authorization database containing information as to who and to what extent configuration operators have access to the plurality of network elements. The network furthermore comprises a rule repository containing predefined parameter dependent rules describing which activity is carried out for the plurality of network elements. The rule repository furthermore contains parameter dependent security information describing whether and how configuring operators are supervised by the security administrator when amending the network element and how the authorization database is amended for the network element. According to one step of the method a request for amending the network element in the network is identified. Furthermore, at least one parameter of the amended network element is determined and at least one rule in the rule repository is determined for which the parameter corresponds to the at least one parameter of the amended network element. In an additional step the security information for the determined at least one rule is determined. The activity of the determined at least one rule is carried out and the authorization database is updated for the amended network element based on the determined security information.

In the present invention the authorization information for the amended network element is generated based on the predefined security information stored in the rule repository. The extension of the authorization to the amended network element is generated based on the predefined security rules contained in the security information. This has the advantage that the security administrator only has to configure the security information and security policy in advance. The security administrator can furthermore decide if and when security administrator interaction is required when a network element is amended. Then the authorization database is updated automatically.

The invention furthermore relates to a network management system configured to amend a network element in a telecommunications network containing the plurality of network elements. Each network element is described by at least one parameter and the system comprises an authorization database containing information as to who and to what extent configuring operators have access to the plurality of network elements. The system furthermore comprises a rule repository containing predefined parameter dependent rules describing which activity is carried out for the plurality of network elements, the rule repository furthermore containing parameter dependent security information describing whether and how configuring operators are supervised by the security administrator when amending the network element and how the authorization database is amended for a network element. Furthermore, a rule engine is provided configured to identify a request for amending the network element in the network, to determine the at least one parameter of the amended network element and to determine the at least one rule in the rule repository for which the parameter corresponds to the at least one parameter of the amended network element. The rule engine is furthermore configured to determine the security information for the determined at least one rule and to determine the activity for the determined at least one rule. The rule engine then furthermore updates the authorization database for the amended network element based on the determined security information.

The rule engine can, using the information of the rule repository, determine the authorization information for the amended network node.

The amendment of the network node can mean that a new network node is added to the network or that an existing network node is removed from the network.

Additionally, the step of amending the network node can also comprise the step of amending the network node, update an operation software, change the tasks carried out by a network node etc.

BRIEF DESCRIPTION OF THE DRAWINGS

The invention will be described in further detail with reference to the accompanying drawings, in which FIG. 1 is a schematic view of a network management system allowing a simplified authorization procedure for an amended network element, FIG. 5 shows an example of data stored in the rule repository.

DETAILED DESCRIPTION

Figure 2:
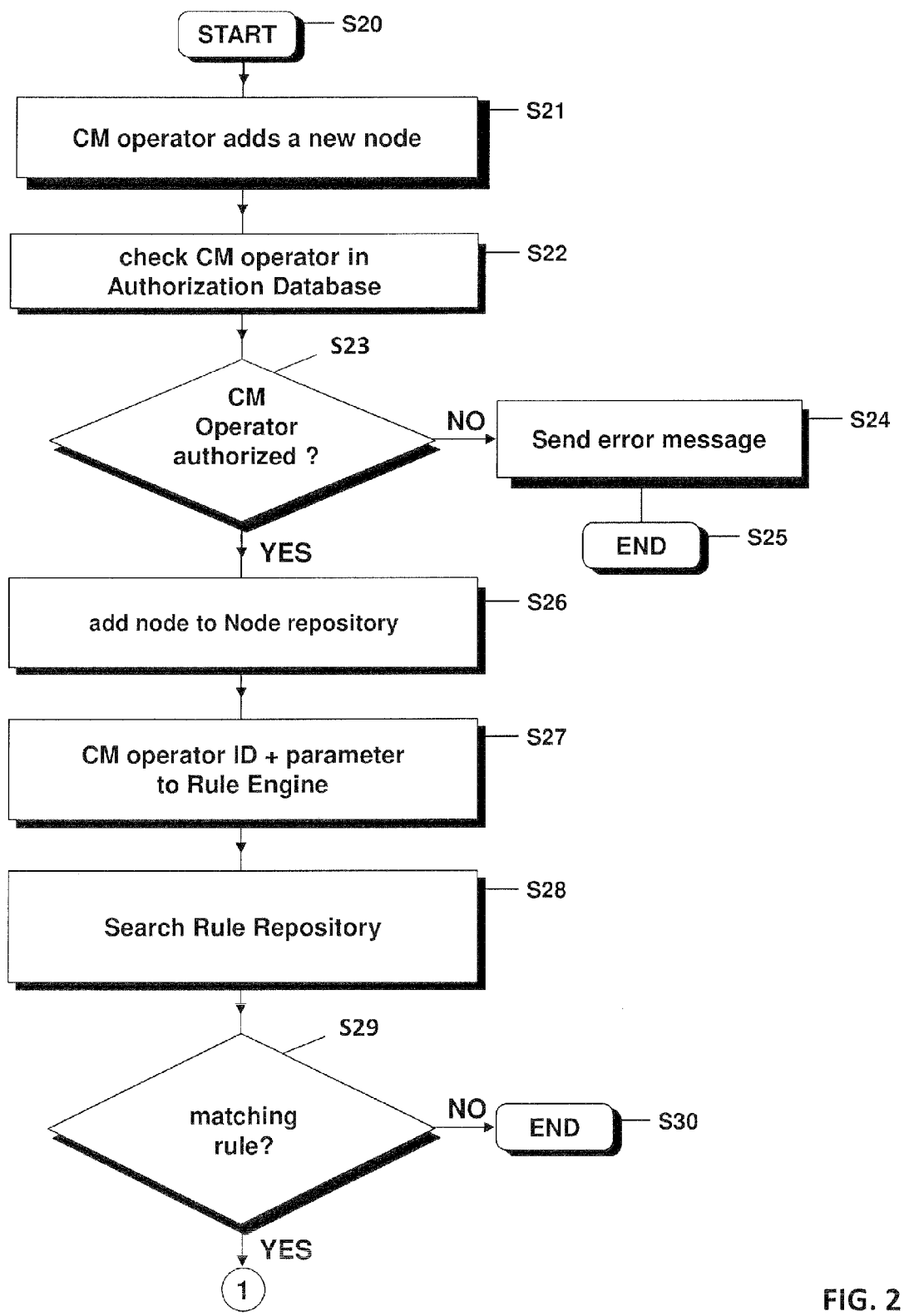
FIG. 2 shows a flowchart comprising the steps how the system of FIG. 1 can operate.

In the following concepts in accordance with exemplary embodiments of the invention will be described in more detail making reference to the accompanying drawings. The illustrated embodiments show an example of a telecommunication management system in which the authorization setting for a new node is created based on the predefined security information or security rules stored by the security administrator in a rule repository and optionally based on an input made by a configuring operator and/or the security administrator.

In FIG. 1 a network management system 100 is shown, in which a configuring operator 200, also named configuration management operator or CM operator hereinafter, should add a network element to the telecommunications network which already comprises a plurality of network elements. In the example shown the plurality of network elements are the radio base stations 400 and the configuring operator may have the task to add a new radio base station to the network. In an alternative embodiment the configuring operator 200 may have the task to remove an existing network element from the telecommunications network or to amend or update an existing network element. In order to add a network element, the configuring operator may use a client, such as NMS client 210, which provides a human machine interface to the system 100.

A security administrator 300 is provided to manage an authorization database 130 provided in the system and to manage a rule repository 140 using a client 310, such as the NMS client shown in FIG. 1.

The system 100 contains a node repository 110 which is a database where the system stores configuration information about the nodes the system manages.

In more general terms the system comprises a network element database where configuration information of the plurality of network elements of the network is stored.

The authorization database 130 stores the information which user has access rights to the different network elements. By way of example, the authorization database may comprise Access Control List entries (ACL entries).

A rule engine 120 has several tasks based on the information provided and based on the information in the rule repository 140. The rule engine decides which activity is carried out for a network element and contains information how and whether configuration operators are supervised by the security administrator when amending a network node, such as when a new network node is added to the network. Furthermore, the rule repository 140 contains information how the authorization database is amended for a network node. The authorization information generated by the rule engine is propagated into the authorization database 130 which can later be used by the system to authorize other configuring operators.

The rule engine 120 creates authorization information based on rules which are written in a formal description language, such as shown in FIG. 5, and which are stored in the rule repository 140. The rule engine 120 updates the authorization database based on the security information determined by the rule engine. The authorization information most typically additionally contains targets or groups of targets part of the authorization database which can comprise the managed network elements.

The system shown in FIG. 1 can be located on a single server or it can be distributed amongst different servers for load balancing or functionality separation. Furthermore, it is possible that the different components are provided on different servers, so that each component has its dedicated server. In another embodiment it is possible that on several servers each component shown in FIG. 1 is provided.

Furthermore, it is assumed that the configuration operator 200 who manages the telecommunications network, such as the radio part or any other network resources, has access to the system 100 via the client 210 or via a presentation layer. Likewise, the security administrator 300 accessing the system via client 310 can create, delete or modify the authorization database 130 directly and can create, delete or modify entries in the rule repository where the rules for the rule engine 120 are stored.

In connection with FIG. 2 a flowchart is shown showing in more detail the steps carried out by the system shown in FIG. 1 when a network element is amended. In the example shown the amendment is the adding of a network node. The method starts in step S20. When a configuring operator installs a new network element or a node in the system 100, the operator 200 defines the node using client 210. This can include the specification of the name of the node, the IP addresses or other properties of the node. This information is then propagated into the system 100 to request installation of the new node (step S21). In the next step S22 the server then checks the configuring operator in the authorization database 100 meaning that it is checked in the authorization database 130 whether the requesting operator 200 is authorized to perform the action (step S23). If this is not the case, the system denies the action and may send an error message in step S24. In this example the method ends in step S25. The error message may be displayed to the operator on the client 210.

If it is determined in step S23 that the configuring operator has sufficient rights to install the new node, the system contacts the new node, exchanges information and the new node is added to the node repository 110 (step S24).

When the node is added to the node repository (step S26) or network element database 110, the rule engine 120 is invoked with input parameters. The input parameters may contain properties of the new node and an ID of the configuring operator allowing to uniquely identify the configuring operator (step S27).

The properties of the node provided to the rule engine can contain an identification information of the node, a network address, such as an IP address of the node, the managed network to which the node belongs (e.g. GRAN (GSM Radio Access Network), WRAN (WCDMA Radio Access Network), LTE, the type of the node (e.g. Radio Base Station (RBS), Radio Network Controller (RNC) or GGSN, etc.).

In step S28 the rule engine is accessed using the input parameters and a query is started whether there is any rule related to the new node in the rule repository (step S29).

Thus, it is asked in step S29 whether there is any matching rule based on the input parameters.

When the result of the query is received from the repository, the rule engine checks whether the result of the query is empty. In case the result of the query is empty meaning that there was no related rule, the process may be terminated in step S30 or the process may be continued as described in the background section.

In case the result of the query is non-empty, then the processing of the rules from the result of the query can start, as will be explained in further detail with reference to FIGS. 3 and 4.

Figure 3:
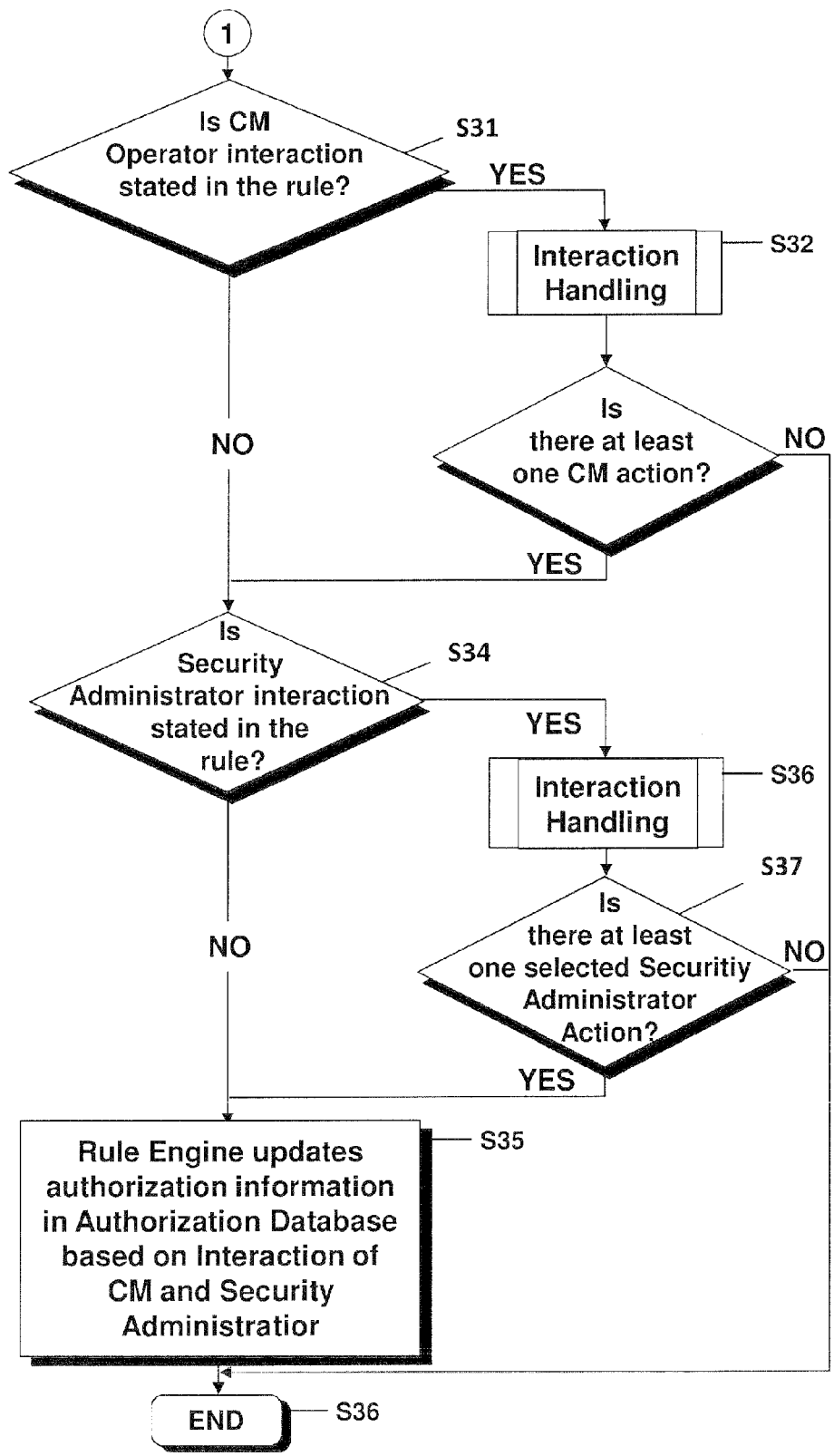
FIG. 3 shows a flowchart comprising the continued operation of the system of FIG. 1.

It should be understood that for each of the results of the query of step S29, the steps shown in FIG. 3 may be carried out. The process shown in FIG. 3 can be started in parallel for the different processes found in the matching step S29 or the processing can be started in a sequential loop.

A rule stored in the rule repository may contain interaction requests from the configuring operator 200 and/or from the security administrator 300. The embodiment shown in FIG. 3 includes a possible processing scenario of the interaction request. The interaction request of the configuring operator 200 or the security administrator 300 may, if both exist, run in parallel or in a sequential way, e.g. when the feedback from the configuring operator 200 is needed first before a query is sent to the security administrator 300.

In general, the results of the two interactions form the final result.

As shown in FIG. 3, it is asked in step S31 whether an interaction of the configuring operator is stated in the rule. If an interaction is requested, an interaction handling sub-process S32 is started, which is explained in further detail in connection with FIG. 4.

Figure 4:
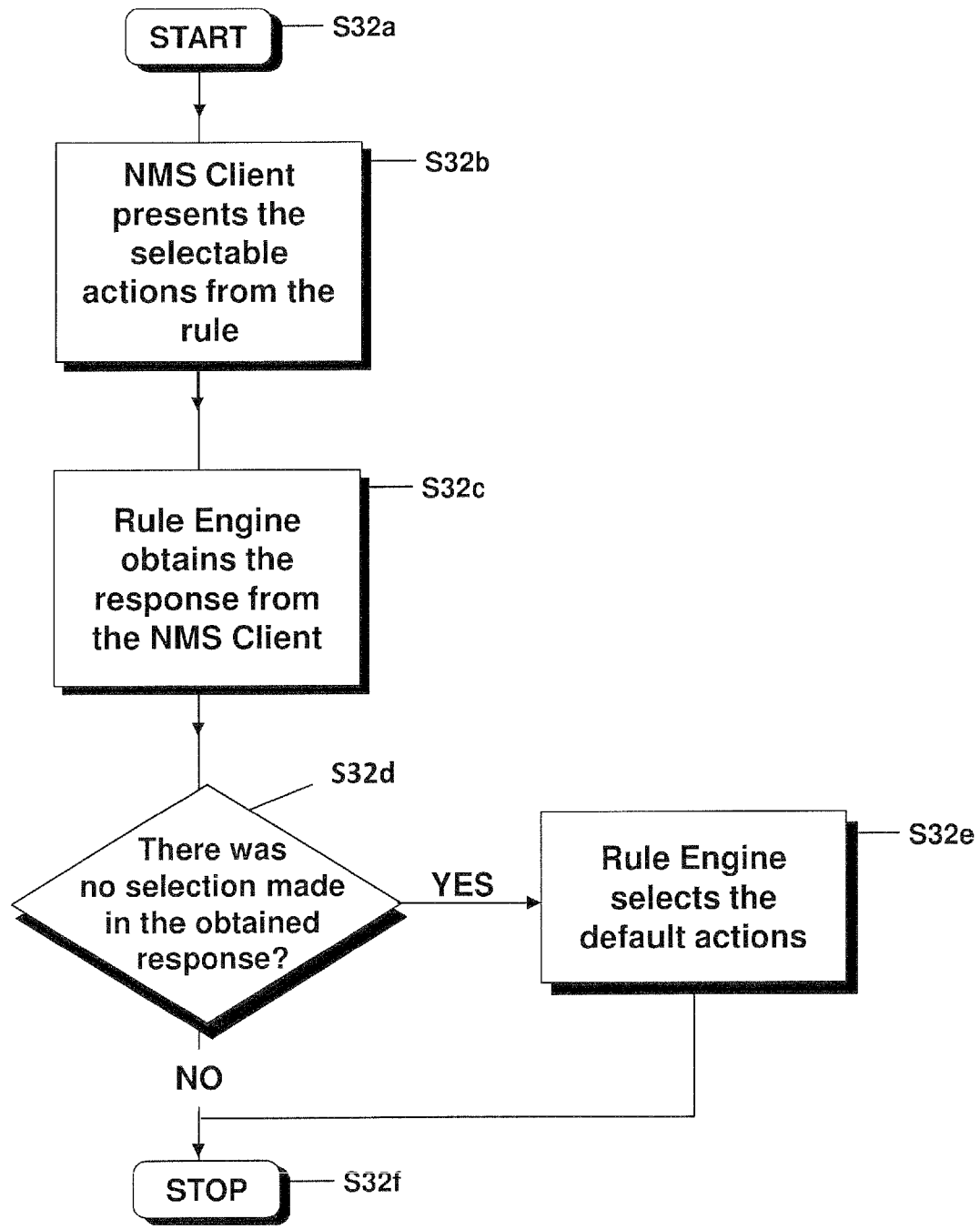
FIG. 4 shows a flowchart containing in more details the step of an interaction handling sub-process used in FIG. 3.

As explained in FIG. 4, the process starts in step S32a. The interaction handling sub-process first sends the selectable actions of the operator as defined by the identified rule to client 210. The client then presents the selectable actions to the operator in step S32b. The human machine interface used by the operator 200 can be a command line or it can be a graphical interface. The operator 200 may then provide a feedback to the system. In the response the operator may amongst others select none of the offered choices, some of the offered choices or all of the offered choices. Additionally, the operator may ignore the request of the client 210. There may be a difference between the fact whether no selection is made from the provided selections or whether no action is selected. In the former case there is no feedback at all, whereas in the latter case the result is that no offered action is selectable.

The NMS client obtains the response from the operator and the response will be propagated and obtained by the rule engine (step S32c). The rule engine then evaluates the obtained response.

Amongst the selectable actions there may be a dedicated action which is marked as default action. This default action means that there was no selection made, so that this default action will be selected (step S32d and S32e).

If there was no selection from the obtained response, meaning that the operator has not made a selection, and if there is a default action, then the rule engine sets the default action as the selected action (step S32e). The purpose of this step is that if the operator wants to simplify the work process, then the operator may not wish to select options on the fly.

The interaction sub-process then finishes in step S32f.

Referring back to FIG. 3, the next step is step S33, where it is checked by the rule engine whether there is at least one selected action. In case there is no selected action, then the processing scenario of the interaction request defined by the specific rule is finished.

In case at least one selected action exists, the process continues and it is checked in the next step S34 where there is interaction stated in the rule for the security administrator 300. If there is no interaction stated in the rule for the security administrator 300, then the selected actions are performed as mentioned in step S35. This means that the rule engine updates the authorization database 130. As will be explained below in further detail, the rules in the rule repository 140 contain security information whether and how configuring operators are supervised by a security administrator as will be explained further below in steps S36 and S37. Furthermore, the rule repository contains security information describing how the authorization database is amended for a network element. By way of example, the security information may contain the information that a new access control list entry is generated indicating who and to what extent different configuring operators have access to the newly installed network node.

Thus in step S35 the action is performed on the authorization database 130 and can contain actions such as an update of an authorization information, create new authorization information or delete existing authorization information. When the authorization database comprises ACL entries, the performed action can mean that either a new authorization ACL is generated, the then existing authorization ACL is updated or an existing authorization ACL is deleted. As can be seen from step S35, the authorization database 130 can be updated automatically based on the rules contained in the rule engine.

Referring back to FIG. 3, the method is explained in further detail whether the security administrator interaction is required. If the security administrator interaction is required, the interaction handling process S36 is started which is the same process as for the configuring operator discussed above in connection with FIG. 4.

This means that the interaction handling sub-process further sends the selectable actions of the security administrator 300 defined in the specific rule to the client 310. The client 310 then presents the selectable actions on the interface. The security administrator 300 then provides feedback to the system. The feedback or response of the security administrator 300 may be the selection of none, some or all of the offered choices. Furthermore, the security administrator may ignore the request of the client. The client 310 obtains a response from the operator and the response will be propagated and obtained by the rule engine 120. The rule engine then evaluates the obtained response.

Amongst the selectable actions there can be a dedicated action which is marked as a default action. This default action means that if no selection was made by the security administrator, this default action will be the selected action.

If there was no selection from the obtained response, meaning that the operator has made no selection, and if there is a default action, then the rule engine sets the default action as the selected action.

The interaction handling sub-process finishes and the rule engine checks in step S37 whether there is at least one selected action by the security administrator 300. In case there is no selected action, the processing scenario of the interaction request defined by the specific rule is finished.

In case there is at least one selected action of the security administrator 300, then the rule engine updates the authorization information in the authorization database 130 based on the interactions of the configuring operator 200 and the security administrator 300. This means that the rule engine updates the authorization information with actions which are selected actions of the configuring administrator restricted with the selected actions made by the security administrator.

Independent from the above said, the interaction of the configuring operator or the security administrator can be summarized in more general words as follows:

The rule can contain a request for an interaction with the configuring operator 200 and/or the security administrator 300 of the network. The rule engine then evaluates a possible feedback of the configuring operator and/or the security administrator before carrying out the activity of the amended network element and before the authorization database is updated.

Furthermore, a set of selectable actions may be transmitted to the configuring operator 200 and/or the security administrator 300, and the rule engine 120 carries out the activity taking into account the feedback from the configuring operator and/or the security administrator.

Generally, when the rule contains a request for interaction with the security administrator, the authorization database 130 is only updated for a network node or network element in accordance with the feedback received from the security administrator.

Referring back to FIG. 3, the method ends in step S36.

In a further embodiment as symbolized in FIG. 1, the security administrator may manually populate the authorization database 130 through the client 310 or by directly accessing the authorization database in the system 100.

It should be understood that the sequence of events shown in FIGS. 2-4 needs not to be executed as indicated. By way of example, the security administrator may be questioned independently and parallel to the configuring operator.

In the following, the rule repository 140 is described in more detail.

A rule in the rule repository 140 can contain preconditions, personal interactions and actions.

A precondition may contain all conditions, except personal interactions. A matching precondition selects the rule for further processing by the rule engine 120. As an example for the precondition, the rule is applied to a node, which type is eNodeB or a node located in a certain geographical area or a node that is installed in a GSM network.

A personal interaction describes the human interaction that is needed to process the rule. As already described above, there are two types of personal interaction, one being the human interaction required by the configuring operator 200 and the other being the human interaction required by the security administrator 300. As an example for personal interaction the configuring operator can select from a list of actions or the configuring operator can accept all provided actions.

An example of a security administrator personal interaction is that the latter can approve all actions performed by the configuring operator which are selected by interaction by the configuring operator. Another example is the approval of some, i.e. a subset, of the actions selected by the configuring operator. Furthermore, it is possible that the security administrator is delegating rights to other people. Furthermore, it is possible that there is no human interaction defined. In this case the human has no right to select or the human does not need to select from the proposed actions. In this case the actions in the rule will be accepted.

An action is defined as an operation in the authorization database. An example for the action of a configuring operator is: "Add the node to network in Dallas" or "Remove the node from group TG23 (Target Group 23, meaning a specific group of network elements) Manchester". An example for the security administrator action can be: "Delegate a fault management advanced role to users/configuring operators in Dallas".

If default action handling is used, an action may have a flag, which shows that the action is propagated to the authorization database if the human has made no interaction.

In the following different examples for rules stored in the rule repository are explained in more detail.

By way of example, the interaction may be

"Selected from list", which means that the operator can select one or more elements from a list in the action field. The list items contain a presented string and a value set which contains the authorization database mapping of the presented string. After the selection is done, the command has to be repeated on all items of the value set of the selected elements. Elements of the list can be marked as default, which means that those elements will be selected by the rule engine as output of "selected from list" interaction if the operator ignored the selection. This type of interaction can be used for both the configuring operator and the security administrator 300.

"Confirm"

This interaction means that the security administrator 300 also can select, multi-select, from a list during the "select from list" interaction, but in this case the list input of selections can contain either the list items which were selected by the configuring operator 200 or can be preconfigured items. If there is no specific security administrator action in the rule, but confirm interaction is required, then the actions carried out by the configuring operator have to be executed on the confirmed elements. If there is a defined security administrator action in the rule, then the security administrator actions with the configuring operator actions have to be executed on the confirmed elements. This type of interaction can only be used by the security administrator.

"Confirm and Create ACL entry"

In this interaction which is an extension of the confirm interaction the security administrator can confirm some or all elements from the input to the security administrator action which is the output of the configuring operator interaction. The rule engine creates ACL entries based on confirmed and other input parameters of actions.

In the example, the formats of the actions are (but the solution is not limited to the given examples)

Command [<object>] (list of elements),
where the optional <object> parameter of command is based on the interaction (like name of nodes which is known by the system), the command can be Add command adds an <object> to groups. The <object> can be the name of node (the target) which is added to those groups which belong to the selected elements of list.

E.g. in a formal form:
Add <object> to elements of List ({<presented string>=>{<values of element to be added>}})

Delete command deletes/removes the <object> from the referred (in the list of element) elements/groups.

E.g. in a formal form:
Delete <object> from elements of List ({<presented string>=>{<values of elements to be removed>}})

Select command contain a presented string of list of elements where the list can contain a presented value and a value set. The selected elements will be the output of that action. This can be used in CM action field and its output can be an input in the security administrator action.

E.g. in a formal form
Select <presented string> List{<presented string>=><value to be selected>{, <presented string>}}

Create with a sub-operation, like ACL entry means that it creates an object with the input and pre-configured parameters. The parameters are between < > and the pre-configured parameters are normal strings.

E.g. in a formal form
Create <sub-operation>({<parameter of sub-operation>})
In case of ACL entry in the authorization database contains user/role, action, target triplets it will be the following in formal form
Create ACL entry (<target>, <action>, <user/role>)

With reference to FIG. 5, one example of the rules stored in the rule repository is explained in more detail. In the following example a new node, a node of type LTE, the node being named as eNodeB12, is added to the NMS system 100 via the NMS client 210 for the configuring operator. After the node is added to the node repository 110, the rule engine 120 is informed about the node integration and it receives the parameters of the node and name of the operator. The rule engine searches the matching rules in the rule repository 140 using the parameters type LTE and node eNodeB12. As can be deduced from FIG. 5, the matching rules are rules 1, 3 and 5. The rule engine can then process those rules in parallel or in a sequential order. One process starts to process the first rule. It checks whether the configuring operator interaction is needed. As it is required by the first rule, the request is sent to the corresponding NMS client 210 so that the operator who requested to add the new node can make the required selection. The rule requires selection from the present list, the list containing the entries Dallas, Houston, Los Angeles, New York, Washington D.C.

The operator can ignore the selection or select either none, one or more of the list items from the list. If the configuring operator selects only one element from the offered list, for example "Dallas", then the rule engine adds the eNodeB12 to the following groups: Dallas, Tex., West Coast, South US State, USA. However, the security administrator has to confirm it, as the security administrator interaction of rule 1 requires confirmation. If the operator selects more elements from the list, e.g. Dallas, Houston and Los Angeles, then this means that the background in the rule engine adds the eNodeB12 to the union of groups of elements. Thus, eNodeB12 will be added to the followings groups in case the security administrator confirms the selection: Dallas, Tex., West Coast, South US, USA, Houston, LA, California.

The operator can also select all elements from the list. In this case the node eNodeB12 will be added to the groups of all selected elements provided the security administrator confirms the selection.

If the configuring operator 200 ignores the selection request, then the rule engine selects the elements marked with the default flag. In the example shown, the Washington D.C. element is selected as default element and the eNodeB12 will be added to the list of groups Washington D.C., East Coast, USA, provided the security administrator 300 confirms the selection. If the configuring operator deliberately selects none of the selectable actions, then no actions will be done from the rule and the process handling this rule is completed.

The rule engine starts another process for handling the third rule as the preconditions are also matched. This process acknowledges that there is no CM interaction in this rule, so no defined CM actions are mandatory from the CM point of view. Furthermore, there is also no security administrator interaction and actions so the mandatory actions are those which are in the CM action of this rule. Thus, the rule engine adds the eNodeB12 to the "All Group", "LTE Group" groups.

Finally, the rule engine starts a process to handle the fifth rule. As can be seen from FIG. 5, the rule engine 120 finds that there is a required configuring operator interaction in this rule. As a consequence, the rule engine sends the request to the NMS client 210 to ask the operator to select those people who have at least read rights to eNodeB12. Client 210 presents the selectable users like operator3, operator4, leader1, leader2, boss1, boss2. The operator may select leader1 and boss1, who may need access to monitor the changes on the nodes.

After having received leader1, the rule engine forwards them to the security administrator as confirmed ACL entry creation interaction is set in the security administrator interaction field. The same happens when receiving boss1.

In the security administrator's client 310, leader1 and boss1 are presented to the security administrator. If the security administrator then selects at least one of them, a new ACL entry will be created for the selected list entry. The new ACL entries will define in the authorization database that the selected users will have read access rights to the eNodeB12 node. The new ACL entries are created by the rule engine 120 for those users who are confirmed by the security administrators. By way of example, if the security administrator selects leader1, as leader1 needs to read the eNodeB12 node, then (eNodeB12, ReadAccess, leader1) ACL entry is created in the authorization database at the end of the rule processing.

With the completion of the first, third and fifth rule the rule engine completes the task regarding the integration of eNodeB12, LTE node.

As can be deduced from the above examples, the invention facilitates the adding of a network element to the telecommunications network. The security administrator only has to define the corresponding rules and the interaction by the security administrator is minimized, as the security administrator interaction is only needed at certain steps of the procedure. The rule engine automatically amends the authorization database taking into account the security related information which describe whether and how the configuring operators are supervised by the security administrator and how the authorization database is amended for the new network element.

Figure 6:
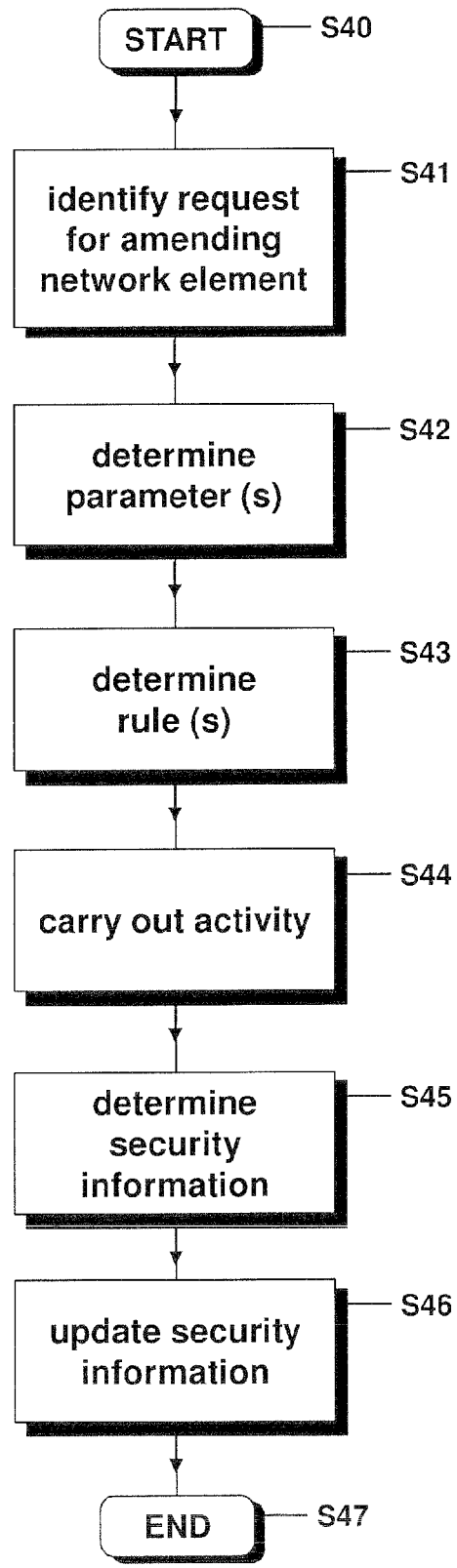
FIG. 6 shows a flowchart summarizing the steps to amend an authorization database.

The method for amending a network element in a telecommunications network containing a plurality of network elements is summarized in FIG. 6. The method starts with step S40. In step S41, the request for amending a network element is identified. This request can be identified when the configuring operator 200 amends a network element in the node repository 110. The rule engine can actively supervise amendments in the node repository in order the detect the request or the node repository can actively inform the rule engine about an amendment. The amendment can be the adding of a network node, the deletion of a network node or the update of a network node. In the next step S42 the parameters of the amended network node are identified. In the example explained above in connection with FIG. 5, the parameters were the parameters LTE, eNodeB12. Based on the identified parameters for the amended network node, the rules are determined in the rule repository 140 which have corresponding parameters stored in a rule (step S43).

In step S44 the activities prescribed by the rules are carried out. These activities, as mentioned above, may contain the interaction of the configuring operator 200 or the security administrator 300. The activity can be that the node is added to a group of network elements, etc. In step S45, the security information is determined in the identified rules. In the above-mentioned example of FIG. 5, the security information or security rule was the creation of the ACL entry in rule number 5 and the information which of the configuring operators have access to the newly added node. In step S46, the authorization database is updated with the determined security rule.

The method ends in step S47.

In general terms, the method may comprise the step of determining whether the configuring operator is authorized to amend the network element. The authorization step may then comprise the step of checking whether the configuring operator is authorized to carry out the activity and comprises the step of checking whether the activity is authorized for the amended network element. This means that the target itself is included in the authorization step. With this embodiment it can be ensured that only certain users or configuring operators have access to certain limited network elements.

Furthermore, it can be deduced from the above that when at least two rules are determined in the rule repository for which the at least one parameter of the amended network element corresponds to the parameter of the rule, the activities of the at least two rules are carried out. Applied to the above example it means that as the parameters met the parameters mentioned in rules one, three and five, all three rules were carried out.

Furthermore, the step of updating the authorization database 130 can contain the step of creating new authorization information, updating existing authorization information or deleting existing authorization information.

The system can comprise at least one user interface, such as the clients 210, 310 configured to receive feedback from the configuring operator 200 and the security administrator 300, respectively. The user interface then supplies the feedback to the rule engine 120 where the feedback is further processed to determine the activity and the update of the authorization database.

Furthermore, the rule engine 120 may be configured to automatically generate the authorization information for the amended network node based on the determined security information and is configured to update the authorization information with the generated authorization information.

It should be understood that each feature described above in connection with other features might be used alone or in connection with any of the other features mentioned in the description.

When a new node is configured, the authorization settings which are generated in the authorization database are not static and are not hard coded as in previously known management and security systems. The present invention provides a flexible and dynamic configuration of the authorization database 130 depending amongst others on the input of the configuring operator, the parameters of the network element and the properties of the environment. The security administrator 300 can be involved on request in the initial network element configuration to supervise or configure the authorization settings. These advantages are especially beneficial for TBAC systems where the authorization contains the subject of the authorization, i.e. the target itself. In systems where the authorization settings of the configuring operator are target dependent and in systems where a large number of network elements is provided, the proposed solution is flexible and secure.

The security administrator 300 is capable of defining company level security policies for the rule repository 140, which when needed will be activated and translated to authorization information in the authorization database of the system. The invention furthermore provides the advantage that the authorization and the configuration is obtained faster while not degrading the security. In systems known in the art the configuring operator 200 installs a node and the authorization setting for the new node was made manually by the security administrator 300 when the security administrator realized that a new node is added. Until the security administrator has not manually given the authorization for the node, the authorization was not given, which means that neither the node was exposed to the users in the network nor was it useful, as nobody could use it. The proposed solution sets the correct security rules during the installation phase, as the authorization information is built from the rule repository and the actual properties of the node and its environment. By providing options for the configuring operator to specify some parameters, the authorization information can be flexibly set. The option that the security administrator can provide feedback assures that the security administrator is involved in the process of the initial configuration if needed. When the configuring operator or the security administrator do not wish to participate in the process, neither the configuring operator nor the security administrator might be involved in the initial node configuration process.

The invention claimed is:

1. A method for amending network element descriptions of a telecommunications network comprising a plurality of network elements, the method including operations comprising:

identifying a request from a configuring operator to amend one of the network element descriptions for a network element from the plurality of network elements, each of the network element descriptions comprising at least one configuration parameter, and each of the network element descriptions describing a corresponding network element of the telecommunications network, wherein the plurality of network elements comprises at least one base station and the telecommunications network further comprises an authorization database comprising access information indicating access modification rights for amending the network element descriptions and a rule repository comprising predefined parameter dependent rules and parameter dependent security information describing security administrator supervision rights for supervising amendments to the network element descriptions;

determining at least one input parameter associated with the request, the at least one input parameter comprising a parameter of the at least one configuration parameter, the parameter comprising identification information for the network element;

determining at least one rule in the rule repository corresponding to the at least one input parameter of the one of the network element descriptions, wherein a first rule of the at least one rule identifies a precondition, a first interaction setting for interacting with a first user type, a second interaction setting for interacting with a second user type different from the first user type, and at least one executable activity;

receiving amendment information responsive to a performance of a first interaction conducted in accordance with the first interaction setting;

receiving security information responsive to a performance of a second interaction conducted in accordance with the second interaction setting, wherein the security information includes an access control list of personnel that have been approved by a security administrator as a result of the second interaction; and executing the at least one executable activity of the first rule based on the amendment information and the security information, wherein the at least one executable activity comprises updating the one of the network element descriptions.

2. The method according to claim 1, wherein the at least one input parameter associated with the request comprises at least one of an identifier of a first user of the first user type, an identifier of the one of the network element descriptions, a network address of the network element corresponding to the one of the network element descriptions, a managed network indicator corresponding to the one of network element descriptions, and a type of the network element described by the one of the network element descriptions.

3. The method according to claim 1, further comprising: evaluating the received amendment information and the security information before executing the at least one executable activity.

4. The method according to claim 3, wherein the performance of the first interaction comprises transmitting a set of selectable actions to a first user of the first user type.

5. The method according to claim 1, further comprising storing the updated one of the network element descriptions in a network element database of the telecommunications network.

6. The method according to claim 1, wherein the step of updating the one of the network element descriptions comprises adding a new network node to the telecommunications network.

7. The method according to claim 1, further comprising: determining, based on the access modification rights, that a first user of the first user type is authorized to amend the one of the network element descriptions, wherein the amendment information is received responsive to the performance of the first interaction with the first user conducted in accordance with the first interaction setting.

8. The method according to claim 1, wherein the at least one rule comprises at least two rules corresponding to the at least one input parameter, and wherein executing the at least one executable activity comprises executing a plurality of executable activities, each executable activity of the plurality of executable activities being associated with at least one of the at least two rules.

9. The method according to claim 1, wherein the step of updating the one of the network element descriptions comprises deleting existing authorization information comprised in the one of the network element descriptions.

* * * * *